INVENTOR
George H. Walters
BY
Wooster & Davis
ATTORNEYS

United States Patent Office 2,752,719
Patented July 3, 1956

2,752,719

AUTOMATIC FISHHOOK WITH LIVE BAIT HOLDER

George H. Walters, Shelton, Conn.

Application April 20, 1954, Serial No. 424,335

5 Claims. (Cl. 43—36)

This invention relates to a fish hook device, and has for an object to provide a fish hook construction in which a plurality of hooks will automatically set themselves upon a strike by a fish.

Another object is to provide a fish hook construction of this character with improved means for securing and holding a live or other bait.

A further object is to provide improved means for securing a live bait to a hook structure, which will merely grip the bait without requiring piercing, reducing injury so that this bait will remain alive much longer.

Figure 1:
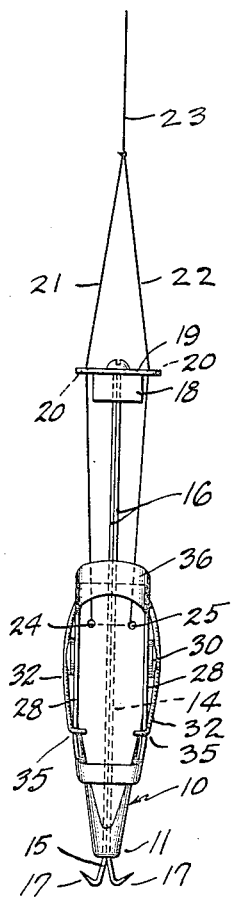
Fig. 1 is a side elevation showing the device in the normal retracted position for use.

The device comprises a body member 10 which is preferably elongated and flattened with a lower end portion tapering to a narrow end 11 so as to have the general form of a fish. This body may be of any suitable construction, but in the form shown is made of two members 12 of any suitable material, either metal, plastic, or other material, and placed side by side and secured together by any suitable means, such, for example, as screws or rivets 13. This body has a longitudinal passage 14 therethrough, and it may be formed half in each of the two members 12. Mounted for longitudinal sliding movement in this passage are one or more, preferably a plurality, of hook members 15, each comprising a normally bowed spring shank 16 slidable in the passage and of greater length than the body so as to project from the opposite ends thereof. In the drawing there are shown four of these hook members, as this is the preferred number, but the number may vary from one or more as found desirable. Each of these members is provided at the lower end of the shank with a sharp hook 17, and the members are secured together at their opposite ends by a head member 18 which may also form a hand grip by means of which the hook members may be shifted longitudinally in the body member, particularly to form a grip by means of which the hook members may be withdrawn to the retracted position of Fig. 1, with the hooks 17 located adjacent the lower end of the body. In this position the normally bowed spring shanks 16 are also held in the straight or stressed position.

The head 18 may also include guide means for guiding it on a fish line or leader connected to the body 10. In the drawing this is shown as a plate 19 secured to the block 18 and provided with laterally spaced guide openings 20 on opposite sides of the member 18 through which may be passed the opposite sides 21 and 22 of the loop of a fish line or leader 23. The side 21, after passing through the guide opening in the plate 19, is passed through an opening 24 extending transversely through the body adjacent the upper end thereof, then along the back of the body and forwardly through a similar laterally spaced opening 25, and extended as shown at 22 through the other opening in plate 19. This arrangement therefore provides guiding means for the head 18 on the loop of the leader or line and also when in the retracted position as shown in Fig. 1 helps to provide a support for the line spaced a distance from the body to reduce the liability of the line becoming entangled in the hook and body structure.

Figure 3:
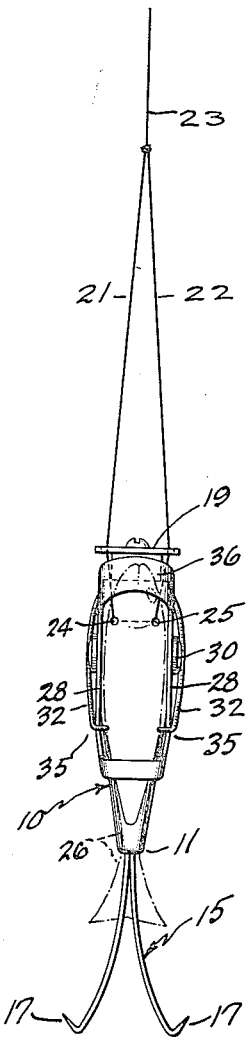
Fig. 3 is a view similar to Fig. 1 showing the hooks expanded.
Figure 4:
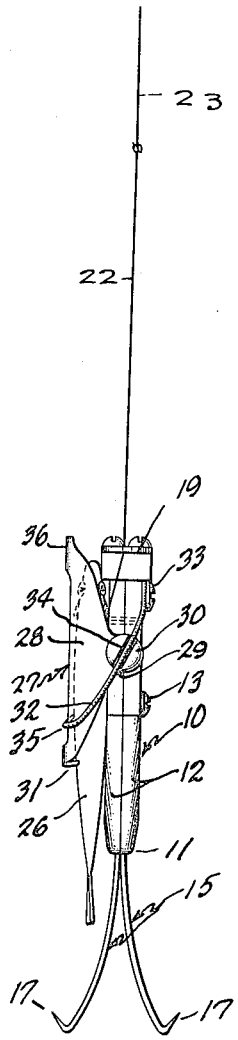
Fig. 4 is a side view looking from the right of Fig. 3.
Figure 2:
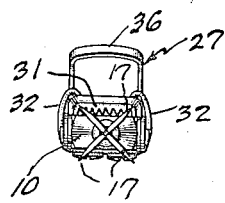
Fig. 2 is a lower end view looking toward the bottom of Fig. 1.
Figure 5:
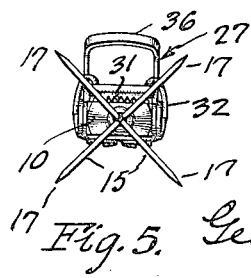
Fig. 5 is an end view looking toward the bottom of Fig. 3.

As previously indicated, when in use the hook members are drawn or shifted in the body to the retracted position of Figs. 1 and 2. In this position the hooks 17 are shifted to a position adjacent to or spaced a short distance from the tapered lower end 11 of the body member, and the normally bowed spring shanks 16 of the hooked members, which may be of tempered steel wire, are held in a straight stressed position by the passage in the body member. The spring action or tendency of these members to assume the bowed position will cause a friction on the sides of the passage in the body which will retain the hook members in the retracted position. If now a fish strikes and grips the hooked ends 17, he will pull downwardly on these hooks and shift the hook members 15 downwardly in the body member to the position shown in Figs. 3 and 4. In this movement the spring action of the shank 16 of the hook members 15 will tend to cause them to assume their normally bowed position, as indicated in Figs. 3 and 4, which action will spread the hooks 17 laterally and separate them and tends to set them in the jaws of the fish. This will also tend to provide a firm grip which will reduce the liability of the fish becoming loose and lost. During the shifting action of the hook members the head member 18 will be guided on the sides 21 and 22 of the line or leader. The act of removing the fish from the hooks is effected and made easier by the operator gripping the head member 18 and shifting it upwardly to thus withdraw the hook members into the body, which will contract or shift the hooks 17 inwardly toward each other to the position of Fig. 1 and assist in removing the hooks from the mouth of the fish.

There is also provided an improved means for securing bait to this hook structure, particularly a live bait such as a minnow, indicated at 26. For this purpose there is mounted on one side of the body a pivoted clamp 27 comprising laterally spaced side members 28 having lugs 29 pivoted to opposite sides of the body member by any suitable means such as pivot screws 30, and said clamp has a toothed gripping jaw or flange 31 at its lower end adapted to be pressed against the bait, such as the minnow 26 for gripping it between the clip and the body 10. The clamp is held in this position by a suitable wire spring 32 secured to the body 10 by any suitable means, such as screws 33, and supported at an intermediate point 34 by being seated in the slot in the screw 30, with its free ends 35 hooked over the outer edges of the sides 28. At the upper portion of the the clamp 27 a cross member 36 connecting the upper ends of the side members 28 forms a finger grip by means of which this grip or clamp may be operated to shift the gripping jaw 31 outwardly to permit insertion of the bait or to release it. As the bait is inserted along one side of the body member 10 between the side members 28, it is held in proper position by these side members, and the transverse grip 36 also helps to retain the upper end of this fish or other bait in position. In the case of a live minnow it is preferably located substantially as shown in Figs. 3 and 4 with its tail projecting somewhat below the hooks 17 when in their retracted position. With this form of gripping and holding means for the bait it is not necessary to pass anything through or pierce the live bait, but it is merely gripped and held without requiring any piercing action, and thus the minnow will receive less injury and remain alive much longer. The open outer side of the clamp member 27 between the side members 28 and the connecting end members 31 and 36 will expose a large portion of the live minnow to increase its visibility as a lure.

Having thus set forth the nature of my invention, I claim:

1. A fish hook device of the character described comprising an elongated body member having a longitudinal passage therethrough, a plurality of hook members mounted for longitudinal sliding movement in said passage, said members each comprising a normally bowed spring shank of greater length than the body so as to project from opposite ends of the body with a hook at a lower end thereof, a head member to which the shanks are connected at their upper ends, means secured to the body adapted to attach a fish line to the body, guide means in the head adapted to guide the head for sliding movement on said first means, and said hook members normally retracted into the body with their hooked ends exposed adjacent the lower end of the body and tending by their spring action to assume their bowed condition so that as the hooks are drawn from the body they are spread outwardly away from each other.

2. A fish hook device of the character described comprising an elongated body member having a longitudinal passage therethrough, a plurality of hook members mounted for longitudinal sliding movement in said passage and of greater length than the body so as to project from the opposite ends thereof, said members each comprising a normally bowed spring shank with a hook at the lower end thereof, said body having means adapted to connect the loop of a fish line comprising spaced side members to the body, a head member connecting the other ends of the shanks and provided with guide means for sliding movement on said side members of said fish line loop when it is connected to the body, and said hook members being straightened when drawn into the body with their hooks adjacent the lower end of the body and tending by their spring action to assume their bowed condition so that when the hooks are shifted to draw them away from the body they are spread laterally to separate them.

3. A fish hook device of the character described comprising an elongated body member having a longitudinal passage therethrough, a plurality of hook members mounted for longitudinal sliding movement in said passage and each having a normally bowed spring shank of greater length than the body so as to project from the opposite ends thereof and provided with a hook at its lower end, a head member connecting the other ends of the shanks and providing finger grip means whereby the hook members may be shifted to a retracted position in the body to straighten their shanks and position their hooked ends adjacent the lower end of the body, means for connecting a fish line adjacent the upper end of the body, means at one side of the body for securing a bait thereto in a position to extend over the hooks when they are in the retracted position, and said shanks tending by their spring action to assume the bowed condition so that when the hooks are drawn away from the body they are shifted laterally away from each other.

4. A fish hook device of the character described comprising an elongated body member having a longitudinal passage therethrough, a plurality of hook members mounted for longitudinal sliding movement in said passage and each having a normally bowed spring shank of greater length than the body so as to project from the opposite ends thereof and provided with a hook at its lower end, a head member connecting the other ends of the shanks and providing finger grip means whereby the hook members may be shifted to a retracted position in the body to straighten their shanks and position their hooked ends adjacent the lower end of the body, means for clamping bait such as a live minnow along one side of the body to extend over the hooks when they are in their retracted position, means adjacent the upper end of the body for connecting a fish line thereto, and said shanks tending by their spring action to assume the bowed condition so that when the hooks are drawn away from the body they are spread laterally away from each other.

5. A fish hook device of the character described comprising an elongated body member having a longitudinal passage therethrough, a plurality of hook members mounted for longitudinal sliding movement in said passage to and from a retracted position in the body and of greater length than the body so as to project from the opposite ends thereof, said members each having a normally bowed spring shank with a hook at its lower end, means for connecting a fish line to the body, a head member connecting the other ends of the shanks and provided with guide means for sliding movement on a connecting means from said body to a fish line when so connected to the body, means for holding a bait such as a live minnow along one side of the body comprising a clamping member pivoted to the body, a gripping jaw at one end thereof adapted to hold the bait in a position to extend over the hooks when they are in the retracted position, a spring tending to shift said jaw to holding position, and a finger grip at the other end thereof for releasing said jaw, and said hook members being straightened when drawn to the retracted position in the body with their hooks adjacent the lower end of the body and tending by their spring action to assume their bowed condition so that when the hooks are shifted to draw them away from the body they are spread laterally to separate them.

References Cited in the file of this patent

UNITED STATES PATENTS

| | | |
|---|---|---|
| 534,694 | Kienle | Feb. 26, 1895 |
| 1,318,073 | Gottschalk | Oct. 7, 1919 |
| 1,734,612 | Coleman | Nov. 5, 1929 |
| 1,816,725 | Freeman | July 28, 1931 |
| 2,311,832 | Helfenstein | Feb. 23, 1943 |
| 2,485,728 | Gardner | Oct. 25, 1949 |
| 2,550,376 | Peterson | Apr. 24, 1951 |
| 2,609,633 | Cracker | Sept. 9, 1952 |
| 2,610,428 | Jones | Sept. 16, 1952 |